United States Patent [19]

Euteneier

[11] Patent Number: 5,016,899
[45] Date of Patent: May 21, 1991

[54] NO-SLACK RESTRICTED-DRUM STABILIZER FOR COMMERCIAL MULTITRAILER COMBINATIONS

[76] Inventor: Leonard Euteneier, Lancaster Rd., Selah, Wash. 98942

[21] Appl. No.: 450,916

[22] Filed: Dec. 14, 1989

[51] Int. Cl.[5] .............................................. B60D 1/30
[52] U.S. Cl. .................... 280/446.1; 280/455.1
[58] Field of Search ................... 280/408, 411.1, 446.1, 280/455.1, 432, 403

[56] References Cited

U.S. PATENT DOCUMENTS

| | | | |
|---|---|---|---|
| 2,612,382 | 9/1952 | Landis | 280/33.9 |
| 3,305,246 | 2/1967 | Gonczy et al. | 280/446 |
| 3,338,595 | 8/1967 | Bogie | 280/446 |
| 3,362,727 | 1/1968 | Malherbe | 280/446 |
| 3,379,456 | 4/1968 | Bogie | 280/445 |
| 3,659,874 | 5/1972 | Rendessy | 280/446 |
| 3,680,891 | 8/1972 | Rendessy | 280/446 B |
| 3,764,164 | 10/1973 | Lankenau | 280/415 B |
| 3,807,764 | 4/1974 | Watts et al. | 280/432 |
| 3,837,676 | 9/1974 | Rendessy | 280/446 B |
| 3,857,586 | 12/1974 | Mascuch | 280/432 |
| 3,871,686 | 3/1975 | Rendessy | 280/446 B |
| 3,880,439 | 4/1975 | Wolter | 280/81 A |
| 3,989,269 | 11/1976 | Rendessy | 280/446 B |
| 4,015,856 | 4/1977 | Van Smith | 280/446 B |
| 4,082,309 | 4/1978 | Fox | 280/446 B |
| 4,162,082 | 7/1979 | Curry | 280/81 A |
| 4,469,347 | 4/1984 | Gier | 280/432 |
| 4,475,740 | 10/1984 | Strick | 280/403 |
| 4,557,497 | 12/1985 | Rumminger | 280/403 |

OTHER PUBLICATIONS

Pp. 1, 2, 3, 8 and 25, "Improving the Dynamic Performance of Multitrailer Vehicles: A Study of Innovative Dollies, Volume 1, Technical Report", Report No. FHWA/RD86/161 Prepared for Federal Highway Administration, Washington, D.C. Jul. 1986, available as Report No. PB-194023 from National Technical Information Service, Springfield, VA 22161.

Primary Examiner—Charles A. Marmor
Assistant Examiner—Alan M. Kagen
Attorney, Agent, or Firm—George A. Cashman

[57] ABSTRACT

An apparatus for reducing or eliminating rearward amplification of yaw in commercial multi-trailer highway combinations by maintaining constant tension on a cable-and-pulley system connecting a towed trailer with a towing trailer, and offering constant resistance to motion of the cable through the pulleys when the towed vehicle begins to yaw with respect to the towing vehicle. The cable is wrapped around a drum having a vertical axis of rotation. Cable tension is maintained by an air spring which slides the drum in a fore-and-aft direction. Resistance to movement of the cable connecting the vehicles is achieved by controlling rotation of the drum by means of a pneumatic brake.

9 Claims, 7 Drawing Sheets

NO-SLACK RESTRICTED-DRUM STABILIZER FOR COMMERCIAL MULTITRAILER COMBINATIONS

BACKGROUND OF THE INVENTION

1. Field of the Invention

The stabilization of multitrailer commercial vehicles has been the subject of many studies and inventions. The problem to overcome is the "yaw" of the second and third trailers in combination operation. The yaw is attributable to the distance between the location of the pintle hitch (articulating joint) and the point of rotation at the centerline of the axle of the lead trailer. This distance causes a rearward amplification of any movement of the trailer fifth wheel. The pintle hitch allows the A-dolly supporting the front of the towed trailer to "walk" or "wander" with any road surface variation, such as wear grooves, road seams and the edge of the pavement.

The following quotations which define the field of the invention, and the problems encountered therein which are resolved by this invention, are taken from a report entitled "Improving the Dynamic Performance of Multitrailer Vehicles: A Study of Innovative Dollies - Volume I Technical Report" (hereinafter UMTRI) performed by the University of Michigan Transportation Research Institute under contract with the Federal Highway Administration. The report date is July 1986, and the report number is FHWA/RD-86/161. It is available through the National Technical INformation Service of the U.S. Department of Commerce, 5285 Port Royal Road, Springfield, Va. 22161.

"The Surface Transportation Act of 1982 allows the use of double-trailer combination vehicles nationwide on the designated highway system. It also allows for the use of commercial vehicle widths from 96 in. (2.44 m) to 102 in. (2.59 m). This Act is generally expected to result in a major increase in the number of multitrailer commercial vehicles in use throughout the U.S.. At the same time, pressure for allowing the use of triples is increasing. In light of the fact that multitrailer vehicles are known to suffer from special dynamic characteristics that can limit their stability and emergency maneuverability characteristics vis-a-vis the tractor-semitrailer, these developments have led to concern over the potential for degradation of the safety quality of the U.S. commercial vehicle fleet . . . It is well established in the literature that maneuvering quality of the tractor-semitrailer portion of an A-train doubles combination vehicle is virtually unaffected by the presence of the full trailer, but that, in emergency maneuvers, the second trailer of the doubles suffers from a "crack-the-whip" phenomenon in which the second trailer substantially exaggerates, or amplifies, the motion of the tractor. The major safety consequence of this "rearward amplification" is the premature (sic) rollover of the second trailer. Rearward amplification and the resulting propensity toward rollover of the second trailer is generally recognized as the property of the double which distinguishes (and degrades) its dynamic performance capability from that of the tractor-semitrailer combination vehicle" UMTRI at page 1.

"The major motivation for the use of multiply articulated trains by commercial trucking interests is to obtain a vehicle with high cargo volume which retains the practical benefit of good, low-speed maneuverability. Within the constraints of vehicle height and width laws, more cargo volume is attained by lengthening the vehicle. Generally, as vehicle length increases, so do maneuvering problems, since the magnitude of low-speed offtracking is directly related to vehicle length. However, the offtracking of a vehicle of a given length is generally reduced by the introduction of additional yaw articulation joints. By virtue of these facts, the so-called A-train doubles combination has become a popular commercial vehicle.

"An A-train consists of a tractor-semitrailer pulling one or more conventional full trailers, where a conventional full trailer consists of a semitrailer whose forward end is supported by a dolly which (1) articulates in yaw relative to the semitrailer, (2) is connected to the towing unit by a single pintle hitch, and (3) has one or more axles whose wheels are nonsteering relative to the dolly frame. While the A-train meets the primary need of providing a large-volume vehicle which can be maneuvered relatively easily at low speed, it is also known to be less stable at highway speeds than is the conventional tractor-semitrailer.

"The dynamic stability of the A-train suffers from the phenomenon known as rearward amplification, wherein, in steering maneuvers of relatively high frequency content, trailing units in the trail will tend to experience higher lateral accelerations than their towing unit. Thus, lateral acceleration "amplifies" as one moves rearward along the train, and the rearmost trailer may experience accelerations much larger than those experienced by the driver in the tractor. The most serious safety consequence of the phenomenon is the resulting rollover of the rear trailer. Further, the addition of yaw articulation joints tends to reduce the yaw damping of the vehicle, and the reduction of low-speed offtracking tends to aggravate high-speed offtracking.

"In recent years, the safety-degrading influence of additional articulation joints has become broadly recognized. Nonetheless, the economic motivations for the use of multitrailer trains is so compelling that the use of such vehicles does and will continue to grow. Efforts to improve the safety quality of these vehicles have led, however, to a number of innovative dollies and hitching mechanisms being developed." UMTRI at pages 2 and 3.

The report identifies seven categories of modified A-dollies, and two categories of B-dollies.

"The so-called A-dolly is, of course, the conventional single-drawbar dolly, which connects to the first semitrailer trailer with a single pintle hitch and to the second trailer with a conventional fifth wheel (converter dolly) or with a turntable bearing (turntable dolly). Modified A-dollies . . . are dollies which retain the pintle hitch or any other form of coupling which permits yaw articulating between the dolly and the first trailer. B-dollies, on the other hand, are dollies which practically eliminate yaw motions between the first trailer and the dolly, usually by using rigid double drawbars and two pintle hitch connections." UMTRI at page 8.

The purpose of the B-dolly is to move the Instantaneous Center of Rotation (IC) forward of the pintle hitch connections. With a conventional A-dolly, the IC is the pintle hitch itself. With a B-dolly, the IC is the imaginary point defined by a forward projection of the effective centerlines of the drawbars. As the IC moves forward of the actual towing connection, the high-speed rearward amplification of lateral movement of the towed trailer is reduced substantially.

The use of B-dollies will improve rearward amplification performance and roll stability. However, "(o)fftracking performance is somewhat degraded relative to the A-train, and many practical considerations of cost, frame stressing, incompatibility of existing trailers, etc., serve to limit the applicability and acceptance of the B-train." UMTRI at page 25.

My involvement with the operation of multitrailer combinations began when I became a driver of multitrailer vehicles, then became Operations Manager for a trucking company, and then was a sales representative for a B-dolly manufacturer. The B-dolly and B-train are considered the most stable way to tow double- and triple-trailer combinations. Most trucking companies are interested in stabilizing multitrailer operation, but object to the cost of retrofitting a fleet. All trailers in the fleet must be reinforced for mounting of two pintle hitches for towing the B-dolly. If the entire fleet is not modified, dispatching becomes almost impossible. One comment made many times was "Why not make a device to stabilize the present A-dolly ?".

The No-Slack Restricted-Drum Stabilizer of this invention is that device. It mounts directly on the tongue of the A-dolly, and provides the same over-the-road stabilization as the B-dolly. The lead trailer must be modified only by mounting two D-ring type fittings on the tail board. If the lead trailer happens not to be modified, there is no dispatching problem, because the modified A-dolly can be towed in the normal manner, by just securing the interconnecting cables of this invention to the dolly tongue.

2. Description of Related Art

My description and comments as to the prior art are given with recognition of certain characteristics that should be present when a device employing a tensioned cable and a restricted drum are used to control or eliminate trailer yaw. The principal force acting upon a trailer is the towing force, which is always there, and which, ideally, will move the trailer along the centerline of travel in a self-correcting manner. The towing force is ordinarily much greater than the yaw force. A sudden removal of the towing force, such as by applying the vehicle brakes allows the yaw force to predominate, sometimes with dire results. External factors cause trailer yaw, and the devices in the cited patents are intended to apply a corrective force to counter the externally-induced yaw. The last thing to do, therefore, when the trailer starts to jackknife, is to apply the brakes, and corrective devices which are activated by application of the brakes are asking for trouble.

Some of the devices in the cited patents rely on springs. The force exerted by a spring is more or less directly proportional to its displacement. When springs are relied on to bring the trailer back in line, they build up a large corrective force which may or may not be required while, at the same time, providing an initially weak countervailing force when the trailer returns rapidly to the centerline. This can possibly cause undesirably large corrections to take place. The corrective force, ideally, should be constant, and should always be available at any position of the trailer.

There is always relative up-and-down motion between the trailer dolly and the towing vehicle. This motion causes slack to occur in the cable of the correcting device. The device must include a means to keep the slack to a minimum or, ideally, to eliminate it altogether.

U.S. Pat. No. 2,612,382 to Landis. This device applies pressure by applying spring force to a captured plate with a backup spring. The spring is used as a return mechanism, so it has to be strong enough to overcome the friction of the pressure plate, resulting in the spring being the tension setter. This results in little force being applied at first movement.

U.S. Pat. No. 3,305,246 to Gonczy et al. This unit uses a block-and-tackle arrangement where the line tension is controlled by a spring.

U.S. Pat. No. 3,338,595 to Bogie. This unit uses a spring to provide cable tension, and a spring-loaded friction plate to restrict cable movement.

U.S. Pat. No. 3,362,727 to Malherbe. This device has a tension spring on each side which reduces the effective force applied.

U.S. Pat. No. 3,379,456 to Bogie. This device works by restricting fluid flow from one side of a cylinder to the other. Slack is taken up by a spring. The first movement is restricted only by the spring until fully compressed, or when pressure on the cylinder is overcome. This unit should work, depending on the size of the spring, but the spring will not give constant tension.

U.S. Pat. No. 3,659,874 to Rendessy. This device has a manual pressure plate for restricting cable movement, but a spring is used to maintain tension. The spring, therefore, provides the first restricting force to the cable.

U.S. Pat. No. 3,680,891 to Rendessy. This device uses a cable wrapped around frictionally-damped rollers, and does not use a spring. There appears to be no way to remove slack caused by up-and-down movement.

U.S. Pat. No. 3,807,764 to Watts et al.. This device works by a brake locking the motion of a disc to which an arm is attached, thus providing a rigid connection between the trailer and the towing vehicle. It appears to be intended for use with only a semitrailer operation. It operates when the vehicle brake is applied, and the driver can also exercise manual control of the braking member.

U.S. Pat. No. 3,837,676 to Rendessy. In this device, a cable is wrapped around several pulleys, one of which may have a restricted movement. Tension is set initially by a toggle. There is no means to compensate for slack cased by up-and-down motion.

U.S. Pat. No. 3,857,586 to Mascuch. This device is intended for use between a tractor and a semi-trailer.

U.S. Pat. No. 3,871,686 to Rendessy. This is similar to ,676 of Rendessy, except none of the pulleys rotate. The same comments apply.

U.S. Pat. No. 3,989,269 to Rendessy. This is a pre-tensioned friction device designed for light--duty towing. There is no provision to take up slack caused by up-and-down motion. It is difficult to see how enough force can be applied to control any movement.

U.S. Pat. No. 4,015,856 to Smith. This is a pre-tensioned device using a cable wrapped around a freely rotating pulley. Shock absorbers attached to the pulley housing offer resistance to induced rotation of the pulley.

U.S. Pat. No. 4,082,309 to Fox. This device comprises a rotor, connected at either side to a fixed bar on the towing vehicle by equal lengths of chain. The rotor is fitted with an electric brake which can be actuated by the driver and by a pressure switch mounted on the side of the trailer at the rear. One would think that the timing of rotor brake actuation would have to be extremely precise to avoid locking the rotor in any but the proper towing position of the trailer.

U.S. Pat. No. 4,469,347 to Gier. This device is used on a unit that has a fifth wheel as part of a tow vehicle. It needs a means of power for the hydraulic motor.

U.S. Pat. No. 3,764,164 to Lankenau. This patent discloses a dolly which is added to a single-rear-axle tractor to enable it to carry heavy loads.

U.S. Pat. No. 3,880,439 to Wolter. This mechanism provides normally rigid alignment of the trailer rear wheels, but has a device which unlocks the wheels and permits self-steer during an actual turn.

U.S. Pat. No. 4,162,082 to Curry. The self-steering dolly of this invention is used under the front of the second trailer. This appears to be a variation of a self-steering B-dolly.

U.S. Pat. No. 4,475,740 to Strick. This patent discloses an articulated double trailer combination with completely different characteristics from the standard highway vehicles in current use.

U.S. Pat. No. 4,557,497 to Rumminger. This patent discloses a second trailer with a retractable towing means for drawing the second trailer flush to the first trailer for convenience in loading.

The patents to Gonczy, Bogie, Malherbe, Rendessy and Fox all appear to be directed toward light-duty devices for use on recreational trailers towed by automobiles and the like.

The patents to Watts and Mascuch appear to be directed toward the connection between a tractor and a semi-trailer, and not to the connection between two trailers, as in the instant invention.

BRIEF SUMMARY OF THE INVENTION

The towing trailer and the towed trailer are joined by a tensioned cable-and-pulley system, the tension in the cable being maintained at a selected constant level by controlling the fore-and-aft movement of the drum around which part of the cable is wrapped. Relative yaw motion of the towed trailer is restricted by a brake cooperating with the drum to provide a constant resistance to rotation of the drum and, therefore, a constant resistance to movement of the cable caused by the tendency to yaw.

A plate is slidably mounted for fore-and-aft movement on the towing yoke of the second trailer. A rotatable drum having a vertical axis is mounted on the plate. The drum is suitable for handling several turns of wire rope, or cable, and also has a radially-extending brake disc. A pneumatically-operated disc brake and shoe is mounted on the plate so as to apply pressure to the brake disc for the purpose of resisting controllably the rotational motion of the drum.

The fore-and-aft movement of the plate on which the drum is mounted is controlled by an air spring. An air spring is a high-strength rubber/fabric flexible air container sealed by a retainer at each end. In operation, air pressure inside the flex member exerts internal force in an axial direction to produce a linear stroke. The air spring used in the described embodiment is a Model 2B9 Super-Cushion Air Spring as manufactured by the Goodyear Tire & Rubber Company. The air spring, under pressure, moves the plate, and consequently the drum, so as to take up any slack in the wire rope, and to maintain a constant tension in the wire rope regardless of any relative up-and-down or fore-and-aft movement between the towing and the towed trailers. The pneumatic disc brake, acting through the cable-and-pulley arrangement, provides a constant resistance to movement of the tensioned cable, and hence to yaw between the towing and the towed trailers.

In actual operation, the air pressure supplied to both the air spring and the pneumatic disc brake is approximately 55 to 60 p.s.i. (3.87 to 4.22 kg/sq cm) when the towed trailer is loaded, and approximately 35 to 40 p.s.i. (2.46 to 2.81 kg/sq cm) when the towed trailer is empty.

When the towed trailer is being maneuvered for loading or unloading, no air pressure is applied to move the plate, or to restrict drum rotation. In other words, the cable is slack. The trailer can thus be maneuvered in the normal manner. In addition, the cables may be detached from the towing trailer, and secured to the dolly tongue of the towed trailer, either for low-speed maneuvering, or in case the towing trailer is not equipped with means for attaching the cables.

A conventional compressed air cylinder could be utilized instead of the air spring. An earlier embodiment of this invention utilized such a cylinder, but the air spring permits a simpler and more trouble-free installation.

The object of this invention is to increase highway safety by effectively eliminating yaw, and thus the rearward amplification of yaw, in multi-trailer commercial highway vehicles.

DETAILED DESCRIPTION OF THE INVENTION

Figure 1:
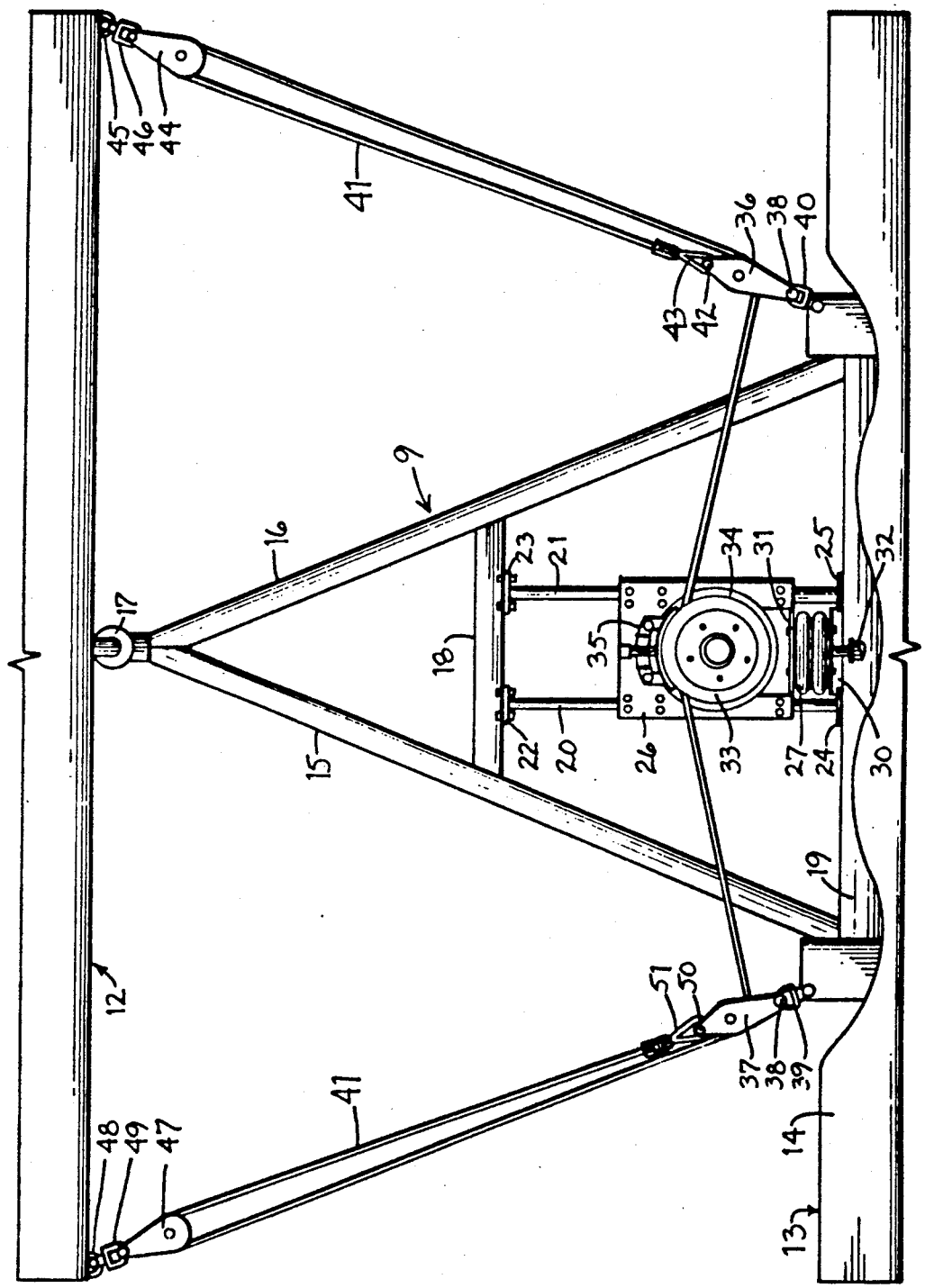
FIG. 1 is a plan view of the invention, including the cables connecting the first trailer to the second trailer, and with a portion of the front of the second trailer cut away.
Figure 2:
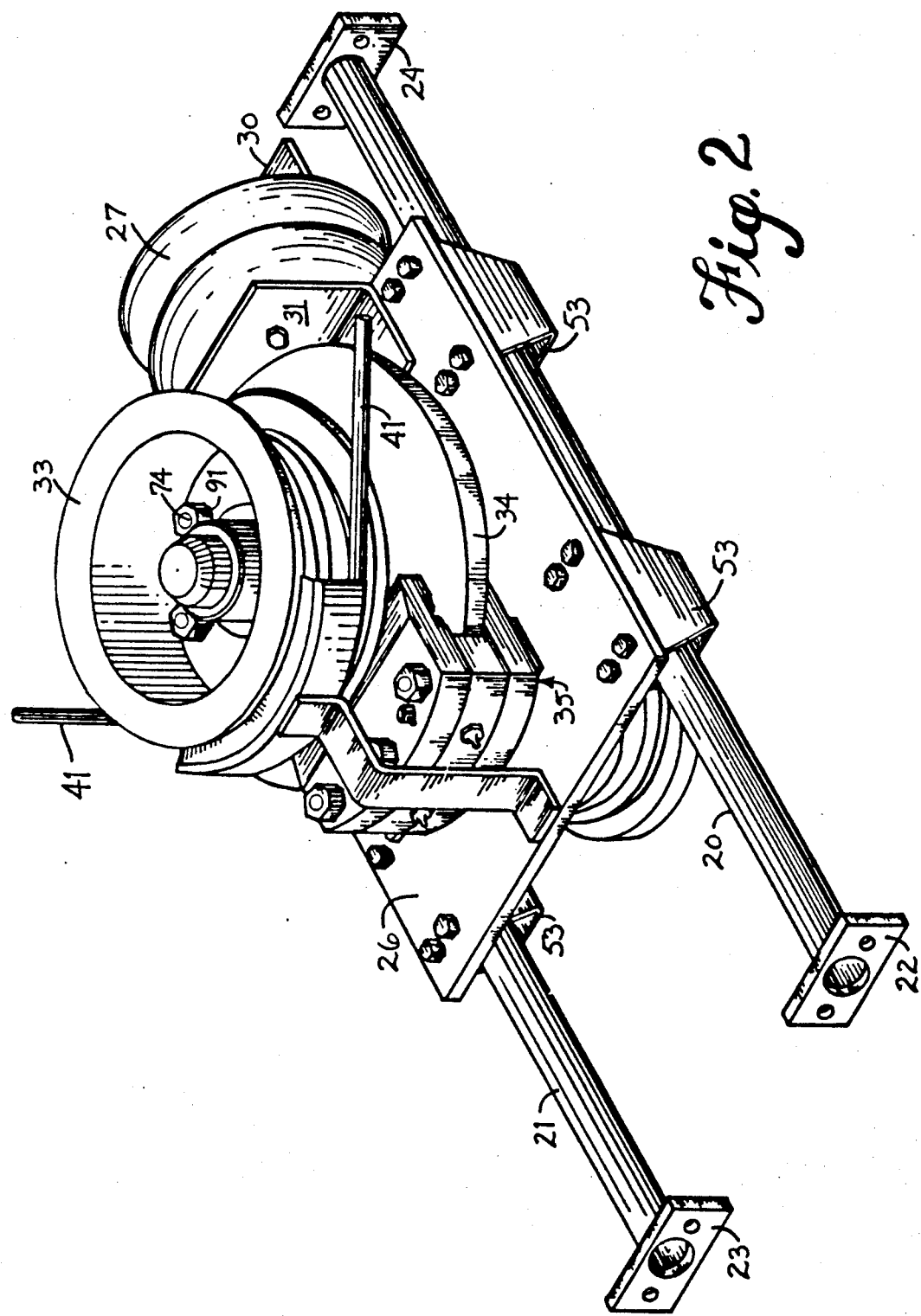
FIG. 2 is a perspective view, not including the cable connections between the trailers.
Figure 3:
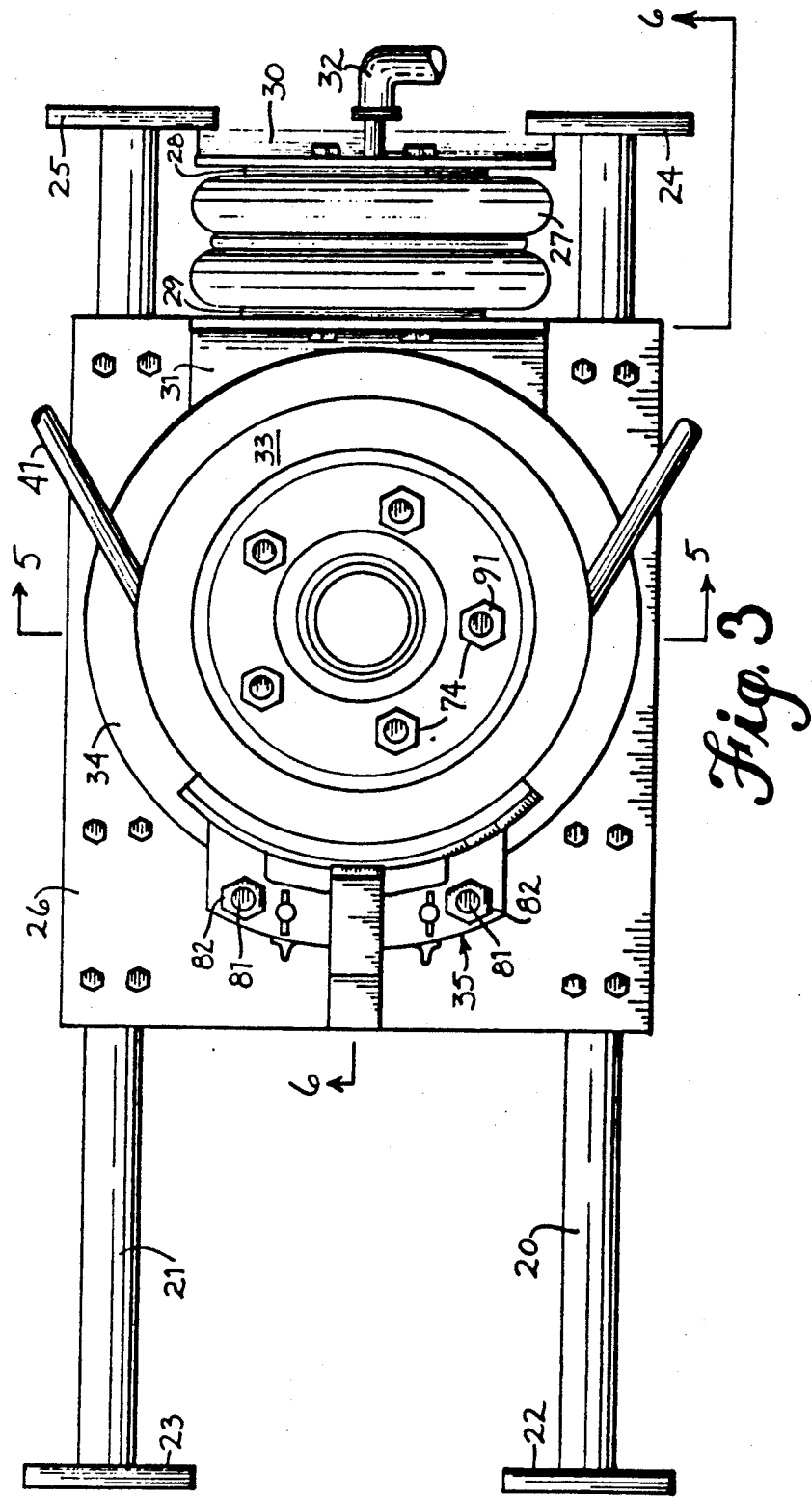
FIG. 3 is a plan view of that portion of the invention shown in FIG. 2.
Figure 4:
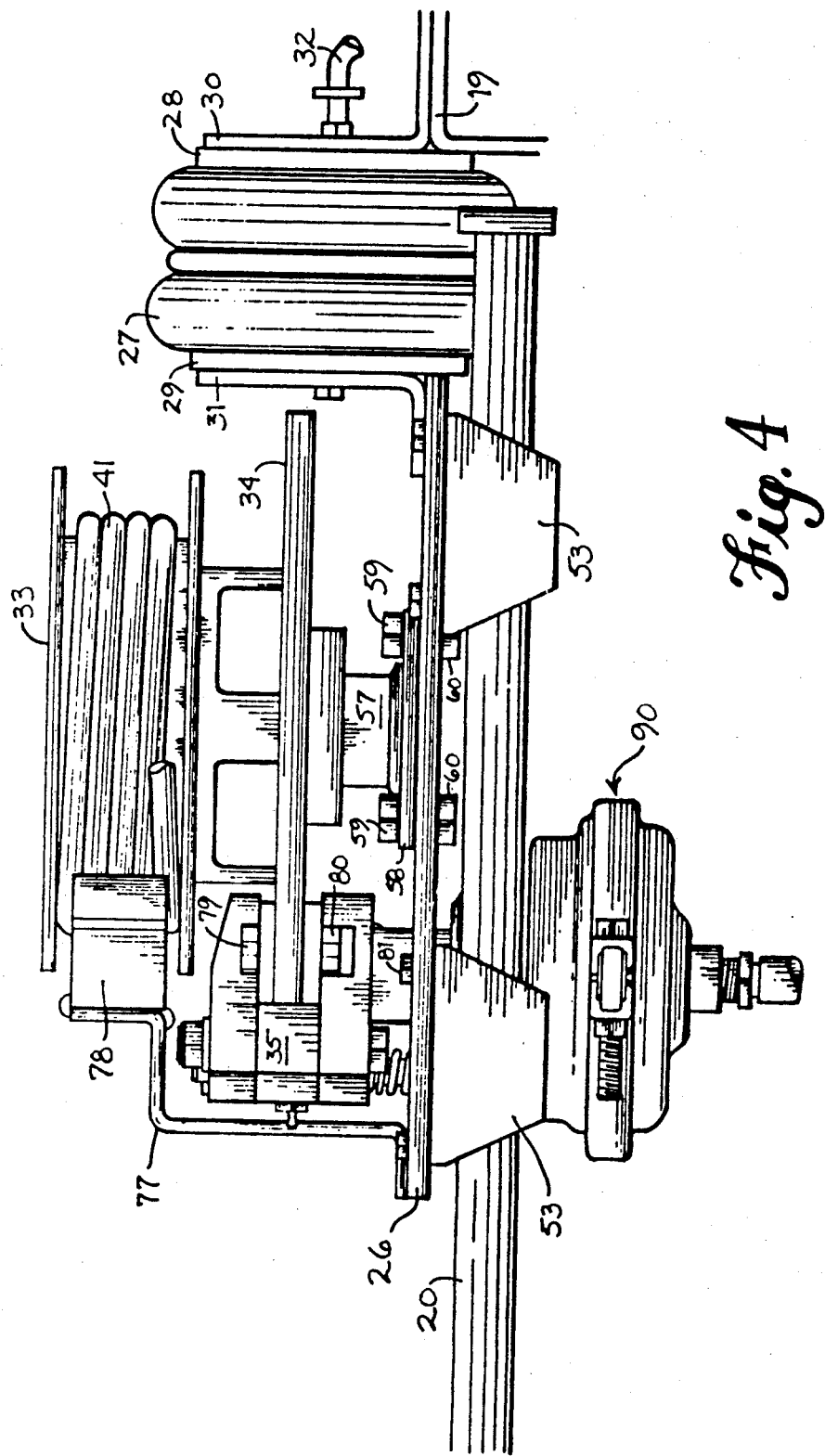
FIG. 4 is a side elevational view of that portion of the invention shown in FIGS. 2 and 3.
Figure 5:
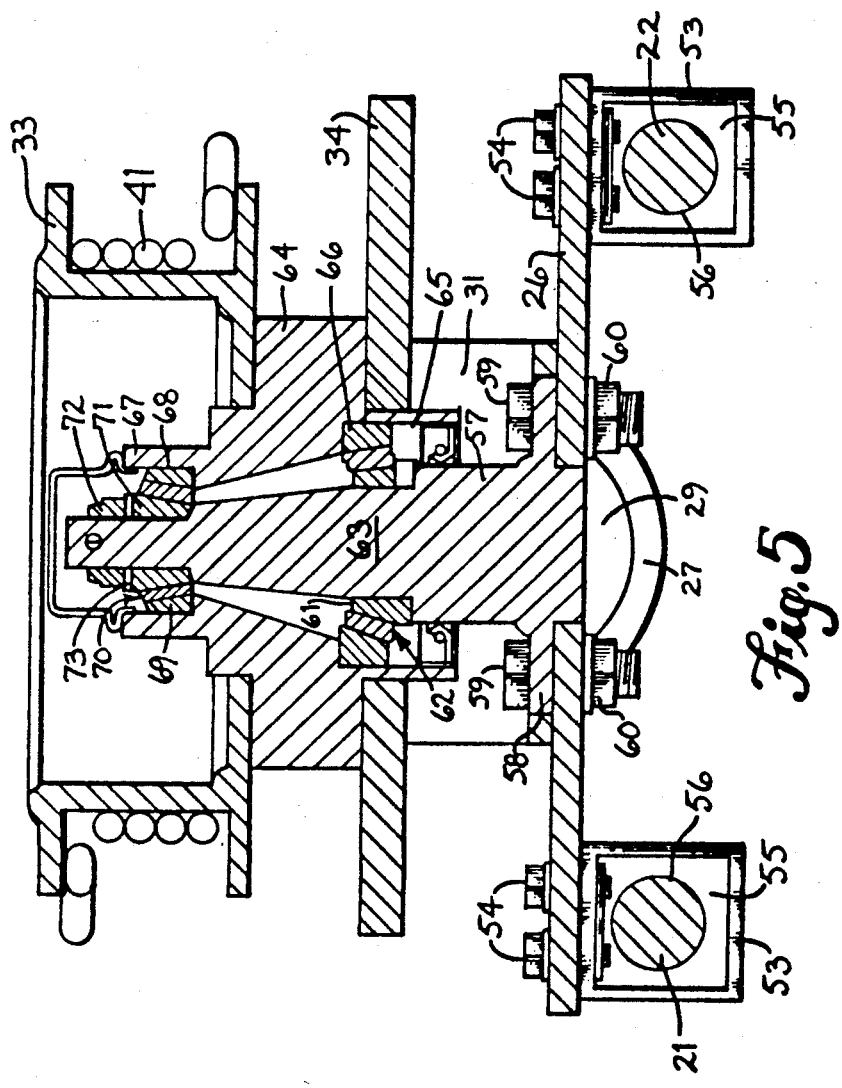
FIG. 5 is a sectional view taken along line 5—5 of FIG. 3.
Figure 6:
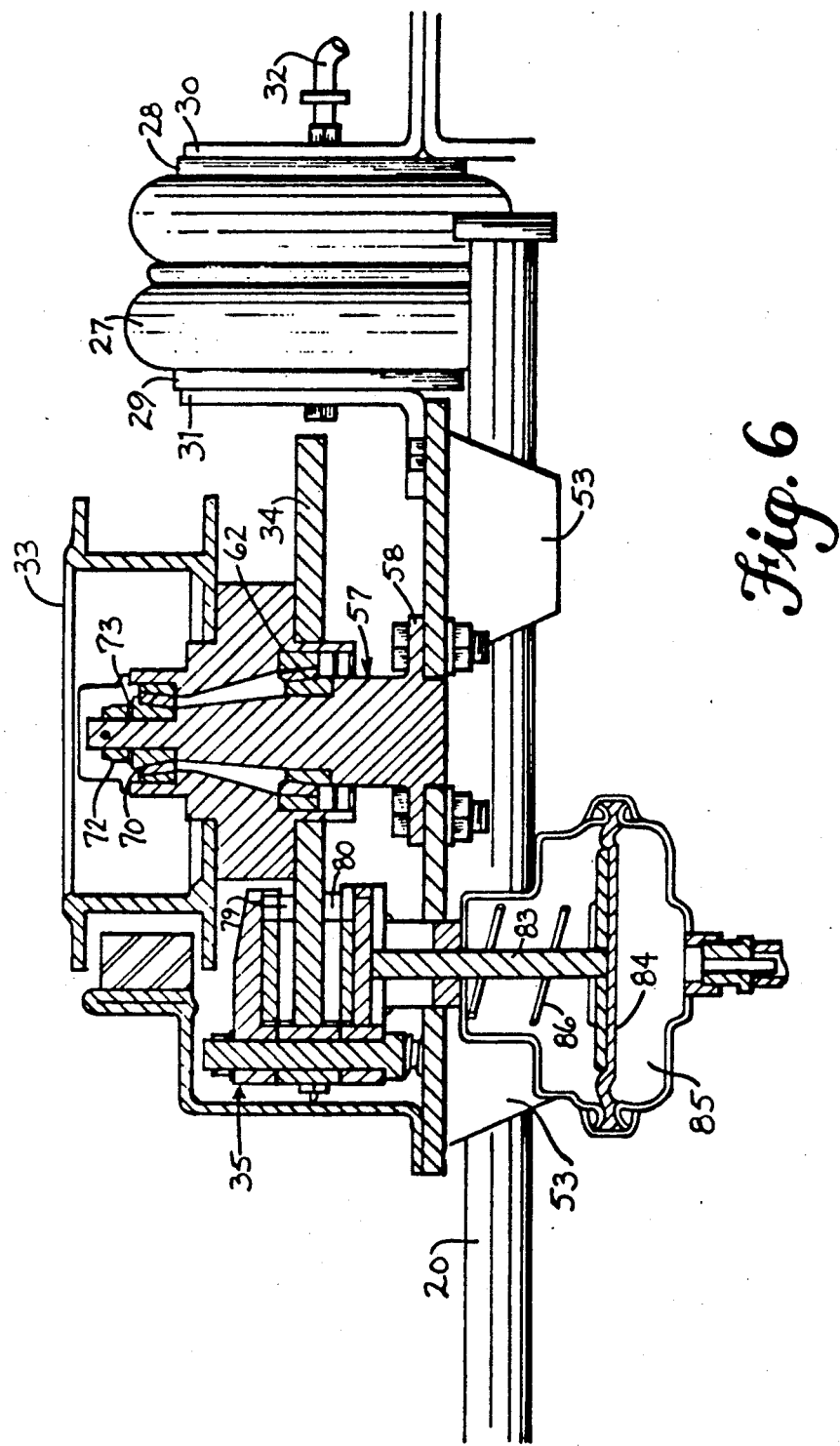
FIG. 6 is a sectional view taken along line 6—6 of FIG. 3.

The overall plan view of FIG. 1 shows the rearmost portion of a first, or towing, trailer 12 and the frontmost portion of a second, or towed, trailer 13, with the forward portion of the cargo compartment of second trailer 13 partially cut away. An A-dolly comprised of converging drawbars 15 and 16 extends from second trailer 13 to first trailer 12, and terminates in pintle hitch 17. Front angle iron 18 is welded transversely to drawbars 15 and 16. There is a rear angle iron 19 under forward portion 14 of second trailer 13. Plate support bars 20 and 21, which are parallel, extend between front angle iron 18 and rear angle iron 19, and are rigidly attached thereto by bolted flanges 22, 23, 24 and 25. Plate 26 is slidably mounted on plate support bars 20 and 21 by means which will be described below. Air spring 27 has an after retainer 28 and a forward retainer 29. After retainer 28 is rigidly attached to bracket 30, which is rigidly attached to rear angle iron 19. Forward retainer 29 is rigidly attached to bracket 31, which is rigidly attached to slidable plate 26. Compressed air is supplied to air spring 27 through fitting 32 in after retainer 28. Drum 33, from which brake disc 34 extends radially, is rotatably mounted on plate 26. Pneumatic brake mechanism 35 is mounted on plate 26 and cooperates with brake disc 34.

Single-sheave pulleys 36 and 37 are attached to dolly 9 by means of bolts 38 and swivel shackles 39 and 40. Cable 41 is attached at a first end to pulley 36 on the right side of dolly 9 centerline by means of bolt 42 in pulley 36 extending through eye 43 in cable 41. Cable 41 is rove through single-sheave pulley 44 which is attached to D-ring 45 on the right rear corner of first trailer 12 by means of swivel shackle 46. Cable 41 is then rove back through pulley 36 and led from there to drum 33. Cable 41 is wrapped around drum 33 several times and is then rove through single-sheave pulley 37, and from there through single-sheave pulley 47 attached to D-ring 48 on the left rear corner of first trailer 12 by means of swivel shackle 49. Cable 41 is then brought back to pulley 37 and attached to pulley 37 by means of bolt 50 passing through eye 51 in the second end of cable 41.

FIGS. 2, 4, 5 and 6 illustrate identical brackets 53 which support plate 26. Each bracket 53 is bolted to the underside of plate 26 by bolts 54, and is filled with a block 55 of nylon-like plastic. Blocks 55 each have a smooth cylindrical passageway throughout to accommodate support bars 20 and 21 with a light sliding fit, thus allowing plate 26 to slide smoothly in a fore-and-aft direction.

Drum spindle 57 is rigidly attached at its lower end 58 to plate 26 by means of bolts 59 and nuts 60. Inner race 61 of roller bearing 62 is fitted to spindle 57 at a reduced diameter section 63 near the middle of spindle 57 with a press fit. Retainer 64, having a large diameter cylindrical bore 65 near its lower end, fits over and rests on outer race 66 of roller bearing 62. At its upper end 67, retainer 64 has a smaller diameter bore 68 which receives outer race 69 of roller bearing 70. Inner race 71 of roller bearing 70 is fitted to spindle 57 with a press fit. The assembly of retainer 64 and roller bearings 62 and 70 is retained on spindle 57 by nut 72 and washer 73. Brake disc 34 is shrink fitted to retainer 64. Drum 33 is attached to retainer 64 by means of capscrews 74. Drum 33 has upper flange 75 and lower flange 76 which are spaced apart sufficiently to accommodate several turns of cable 41. Cable keeper 77 having shield 78 is welded to plate 26 so as to prevent cable 41 coming off drum 33 when no air is supplied to air spring 27. A commercially available disc brake assembly 35 having friction shoes 79 and 80 is attached to plate 26 by means of bolts 81 and nuts 82, and cooperates with brake disc 34. The brake assembly 35 used in the preferred embodiment of this invention is that which is used in the Dodge Omni, but any number of other such assemblies would be suitable, and would work just as well. Pressure is applied to brake 35 by diaphragm rod 83 actuated by air pressure applied to diaphragm 84 in cylinder 85. Spring 86 operates to reduce friction between shoes 79 and 80 and brake disc 34 as air pressure is reduced. The cylinder assembly 90 comprising parts 83, 84, 85, and 86 is a commercially available assembly.

Figure 7:
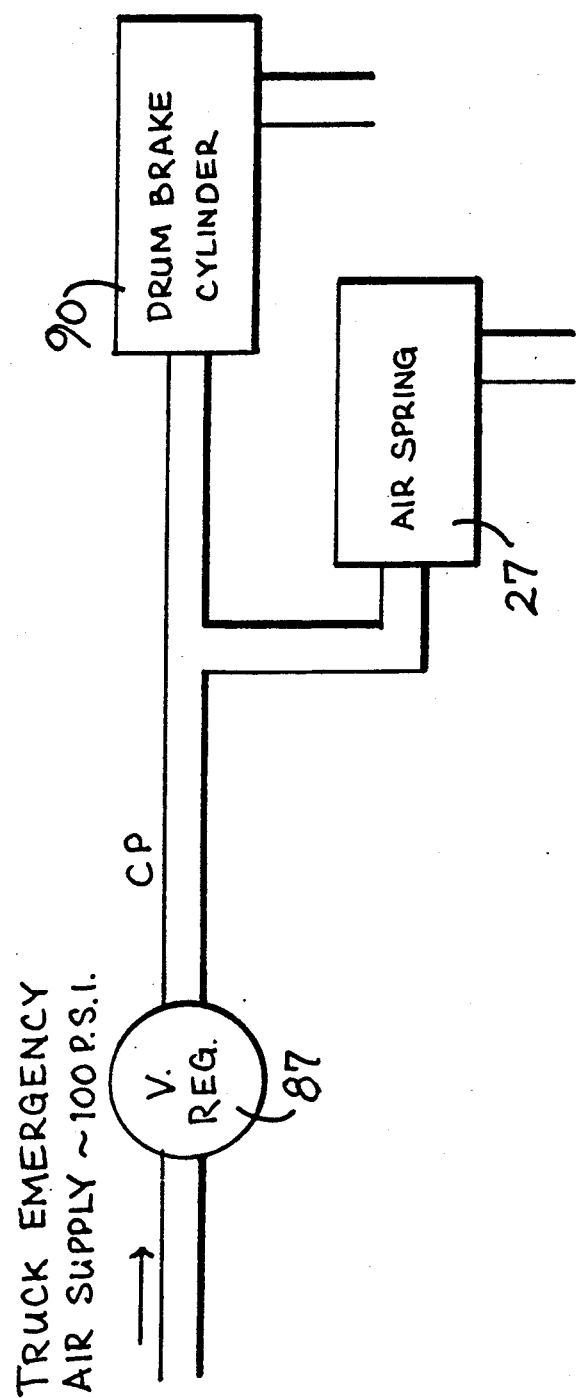
FIG. 7 is a schematic of the air supply system.

The air supply system is simple, and is illustrated in FIG. 7. The truck emergency air system, which operates at approximately 100 p.s.i. (7.3 kg/sq cm) is used. A regulating valve 87 is used to reduce the air pressure from the emergency air system to the levels set forth earlier in this specification. Air spring 27 and brake cylinder assembly 90 both operate at approximately the same air pressure.

It can be seen from the foregoing that a constant tension can be maintained in the cable 41 by applying a constant force to air spring 27 which controls fore-and-aft motion of drum 33. Any variations in cable tension caused by relative fore-and-aft motions or relative up-and-down motions between the towing trailer 12 and the dolly 9 will be insubstantial when a constant pressure is applied to air spring 27. It can also be seen that a constant resistance applied against rotation of disc 34 will keep yawing to a minimum by having a substantial level of resistance present at the onset of a yaw.

This invention has been used with double trailers in commercial highway service over mountain passes in the wintertime, as well as in full speed highway service. Drivers have attempted, under various load and road conditions, to induce "rearward amplification", and cannot do so. The combination of constant cable tension and constant resistance to yaw is effective.

While this invention is susceptible of embodiment in different forms, the drawings and the specification illustrate the preferred embodiment of the invention, with the understanding that the present disclosure is to be considered an exemplification of the principles of the invention, and the disclosure is not intended to limit the invention to the particular embodiment described.

I claim;

1. Apparatus for controlling yaw between a towed trailer and a towing trailer in highway operation of commercial multi-trailer combinations wherein the combination includes a tractor vehicle, said tractor vehicle having a compressed air system capable of supplying compressed air to all vehicles in the combination, and wherein a towing connection between any two adjacent trailers is a dolly having a frame under the forward portion of the towed trailer, and said dolly having a tongue, said tongue comprising converging arms extending forwardly from the dolly frame and having a pintle hitch at the point of convergence of the dolly arms, said apparatus comprising:
   a horizontally-disposed cable-and-pulley system connecting the dolly of the towed trailer to the towing trailer, said cable-and-pulley system including a rotatable drum mounted on a dolly tongue of the towed trailer, the drum having a vertical axis of rotation;
   a means to maintain constant tension on the cable of the cable-and-pulley system, said means comprising a means to controllably move the drum in a fore-and-aft direction;
   a means to restrict cable movement caused by relative yaw between the towing trailer and the dolly of the towed trailer.

2. The apparatus of claim 1 wherein the means to maintain constant cable tension comprises:
   the cable-and-pulley system being arranged in approximately the same horizontal plane as the drum, and a portion of the cable being wrapped around the drum;
   wherein the means to restrict cable movement caused by relative yaw between the towed trailer and the towing trailer comprises a means to control rotation of the drum.

3. The apparatus of claim 2 wherein the cable-and-pulley system comprises:
   the towing trailer having a cargo floor, a rearmost end of which terminates in a rear member extending the width of the towing trailer;

a first pulley shackled to the dolly frame at a right forward corner thereof;

a second pulley shackled to the dolly frame at a left forward corner thereof;

a third pulley shackled to the rear member of the towing trailer near the right end thereof;

a fourth pulley shackled to the rear member of the towing trailer near the left end thereof;

all of said pulleys comprising a block and a sheave rotatable within the block;

all of said pulleys being located in approximately the same horizontal plane as the drum; and a cable having a first end and a second end, and shackled at its first end to the block of the first pulley, then passing through the third pulley, thence back through the first pulley, thence wrapped around the drum, thence passing through the second pulley, thence passing through the fourth pulley, from which the second end of the cable is led to the block of the second pulley and shackled thereto.

4. The apparatus of claim 2 wherein the means to allow and to control fore-and-aft movement of the drum comprises:

a horizontally-disposed slidable plate having an upper surface and a lower surface, and to the upper surface of which the drum is rotatably mounted;

a plate support and guide means attached to the dolly tongue allowing the plate to slide in a fore-and-aft direction with respect to the dolly;

a first crossbar connecting the arms of the dolly near their after ends; and a pneumatically-operated extensible device fixedly attached at its after end to the first crossbar, and fixedly attached at its forward end to the slidable plate.

5. The apparatus of claim 4 wherein the plate support and guide means comprises:

a second crossbar connecting the arms of the dolly tongue approximately midway of their length;

two parallel cylindrical support bars, one on either side of the dolly centerline and equidistant therefrom, each bar being rigidly attached at its forward end to the second crossbar, and rigidly attached at its after end to the first crossbar;

four cylindrically-bored bearing blocks attached to the lower surface of the slidable plate, each block being so located as to receive said support bars in a sliding fit, the blocks being disposed with two on either side of the dolly tongue centerline in a symmetrical spaced-apart relationship.

6. The apparatus of claim 4 wherein the pneumatically-operated extensible device is an air spring oriented for actuation in a fore-and-aft direction, said air spring having a forward retainer and an after retainer and otherwise comprising:

a first right-angle bracket with its horizontal leg fixedly attached to the first crossbar, and its vertical leg fixedly attached to the air spring after retainer;

a second right-angle bracket with its horizontal leg attached to the slidable plate near the after edge of said plate, and its vertical leg fixedly attached to the air spring forward retainer;

a compressed air fitting attached to and penetrating the air spring after retainer; and an air pressure regulating valve installed in the compressed air supply system upstream of both the air spring and the means to control rotation of the drum.

7. The apparatus of claim 4 wherein the means to control rotation of the drum comprises:

a brake disc fixed to the rotatable drum structure and projecting radially therefrom concentric with the drum rotational axis;

a pneumatic brake assembly fixed to the slidable plate and comprising:

a brake shoe holder and actuator with brake shoes oriented above and below the brake disc near its periphery; and a pneumatic cylinder, diaphragm, diaphragm rod and return spring assembly, the diaphragm rod being connected to the brake shoe actuator so as to apply the brake shoes to the brake disc when compressed air is supplied to the cylinder.

8. Apparatus for controlling yaw of a commercial highway trailer having at least one rear axle, said trailer being pivotally supported at its front by a dolly having a frame and a tongue comprising forwardly-extending converging arms and a pintle hitch at the point of convergence of said arms, the trailer being towed by a preceding trailer, said apparatus comprising:

a drum having a vertical axis of rotation;

a cable-and-pulley system connecting the towing trailer and the dolly of the towed trailer, the system being disposed in the same horizontal plane as the drum;

a plate on the dolly tongue on which the drum is rotatably mounted, the plate having fore-and-aft slidable capability with respect to the dolly tongue, the fore-and-aft displacement of the plate-mounted drum being sufficient to place tension on the cable;

a pneumatic means mounted between the dolly tongue and the slidable plate for moving the plate;

a disc brake fixed to the drum structure and extending radially therefrom; and a pneumatic brake mounted on the plate and cooperating with the brake disc to control rotational movement of the drum around which the cable is wrapped and tensioned.

9. A method of controlling yaw between trailers in highway operation of commercial multi-trailer combinations, said combinations having a compressed air system capable of supplying compressed air to all vehicles in the combination, and wherein a towing connection between trailers is a pintle hitch on a dolly having a dolly tongue, said dolly tongue extending forward from a towed trailer to a towing trailer, and wherein the towing trailer and the dolly of the towed trailer are also connected to each other by a cable-and-pulley system, which includes a rotatable drum mounted on a dolly tongue of the towed trailer, the drum having a vertical axis of rotation, said method comprising:

placing a predetermined constant tension on the cable of the cable-and-pulley system;

maintaining said predetermined constant tension by controllably moving said drum in a fore-and-aft direction; and restricting movement of the cable through the pulleys at the onset of yaw.

* * * * *